United States Patent [19]

Pavlidis et al.

[11] Patent Number: 5,278,398
[45] Date of Patent: Jan. 11, 1994

[54] DECODING BAR CODE SYMBOLS BY DETERMINING THE BEST ALIGNMENT OF PARTIAL SCANS

[75] Inventors: Theodosios Pavlidis, Setauket; Joseph Cai, Bohemia, both of N.Y.

[73] Assignee: Symbol Technologies, Inc., Bohemia, N.Y.

[21] Appl. No.: 783,412

[22] Filed: Oct. 28, 1991

Related U.S. Application Data

[63] Continuation of Ser. No. 461,882, Jan. 5, 1990, abandoned.

[51] Int. Cl.⁵ .............................................. G06K 7/10
[52] U.S. Cl. ................................................... 235/462
[58] Field of Search ................ 235/462, 463, 472, 437

[56] References Cited

U.S. PATENT DOCUMENTS

| | | | |
|---|---|---|---|
| 4,239,151 | 12/1980 | Enser et al. | 235/437 |
| 4,251,798 | 2/1981 | Swartz et al. | 235/462 |
| 4,289,957 | 9/1981 | Neyroud et al. | 235/462 |
| 4,308,455 | 12/1981 | Bullis et al. | 235/463 |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |
| 4,409,469 | 10/1983 | Yasuda et al. | 235/463 |
| 4,409,470 | 10/1983 | Shepard et al. | 235/472 |
| 4,460,120 | 7/1984 | Shepard et al. | 235/472 |
| 4,488,678 | 12/1984 | Hara et al. | 235/463 |
| 4,717,818 | 1/1988 | Broockman et al. | 235/462 |
| 4,760,248 | 7/1988 | Swartz et al. | 235/472 |
| 4,794,239 | 12/1988 | Allais | 235/462 |
| 4,916,297 | 4/1990 | Tukada et al. | 235/462 |
| 4,967,074 | 10/1990 | Von Stein | 235/467 |
| 4,973,829 | 11/1990 | Ishida et al. | 235/462 |
| 5,155,343 | 10/1992 | Chandler et al. | 235/462 |

Primary Examiner—Davis L. Willis
Assistant Examiner—Edward H. Sikorski

[57] ABSTRACT

A method for decoding bar code symbols in which a bar code reader and associated components scan a bar code symbol, produce a representation of the symbol, and attempt to decode that representation in order to produce a character message. The method consists of the steps of storing a first representation of the bar code symbol corresponding to a first scan path through a first portion of said symbol smaller than the entire symbol, and storing a second representation of the bar code symbol corresponding to a second scan path through the symbol. The method then processes said representations in the event a successful decode has not taken place by utilizing the signal from a first scan with the signal from a subsequent scan to determine the best alignment at which successive scans can be concatenated to form a combined signal. The process is repeated with different subsequent scans until successful decoding of the combined signal.

15 Claims, 5 Drawing Sheets

| CHAR. | PATTERN | BARS | SPACES | CHAR. | PATTERN | BARS | SPACES |
|---|---|---|---|---|---|---|---|
| 1 | | 10001 | 0100 | M | | 11000 | 0001 |
| 2 | | 01001 | 0100 | N | | 00101 | 0001 |
| 3 | | 11000 | 0100 | O | | 10100 | 0001 |
| 4 | | 00101 | 0100 | P | | 01100 | 0001 |
| 5 | | 10100 | 0100 | Q | | 00011 | 0001 |
| 6 | | 01100 | 0100 | R | | 10010 | 0001 |
| 7 | | 00011 | 0100 | S | | 01010 | 0001 |
| 8 | | 10010 | 0100 | T | | 00110 | 0001 |
| 9 | | 01010 | 0100 | U | | 10001 | 1000 |
| 0 | | 00110 | 0100 | V | | 01001 | 1000 |
| A | | 10001 | 0010 | W | | 11000 | 1000 |
| B | | 01001 | 0010 | X | | 00101 | 1000 |
| C | | 11000 | 0010 | Y | | 10100 | 1000 |
| D | | 00101 | 0010 | Z | | 01100 | 1000 |
| E | | 10100 | 0010 | - | | 00011 | 1000 |
| F | | 01100 | 0010 | . | | 10010 | 1000 |
| G | | 00011 | 0010 | SPACE | | 01010 | 1000 |
| H | | 10010 | 0010 | * | | 00110 | 1000 |
| I | | 01010 | 0010 | $ | | 00000 | 1110 |
| J | | 00110 | 0010 | / | | 00000 | 1101 |
| K | | 10001 | 0001 | + | | 00000 | 1011 |
| L | | 01001 | 0001 | % | | 00000 | 0111 |

(PRIOR ART)

FIG. 2

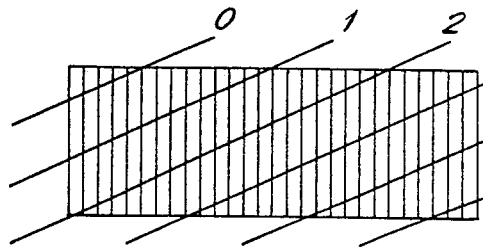
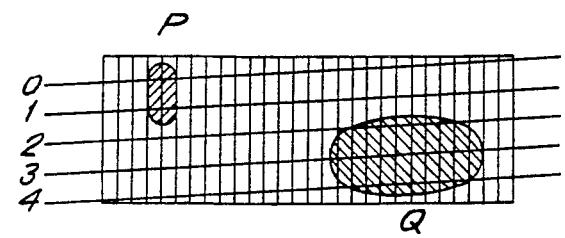
FIG.5A  FIG.5B
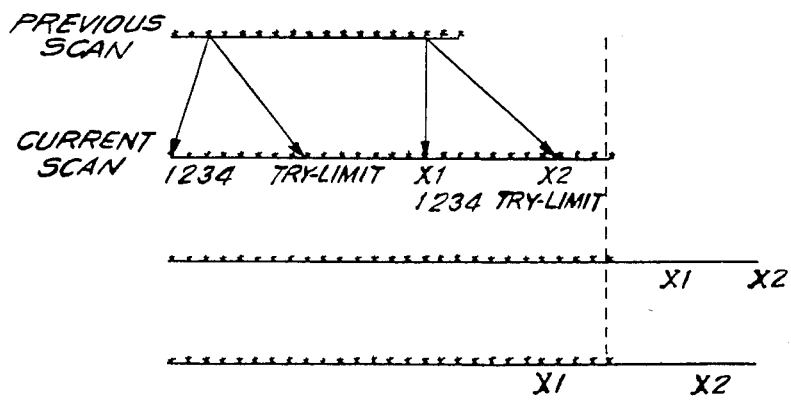
FIG.6
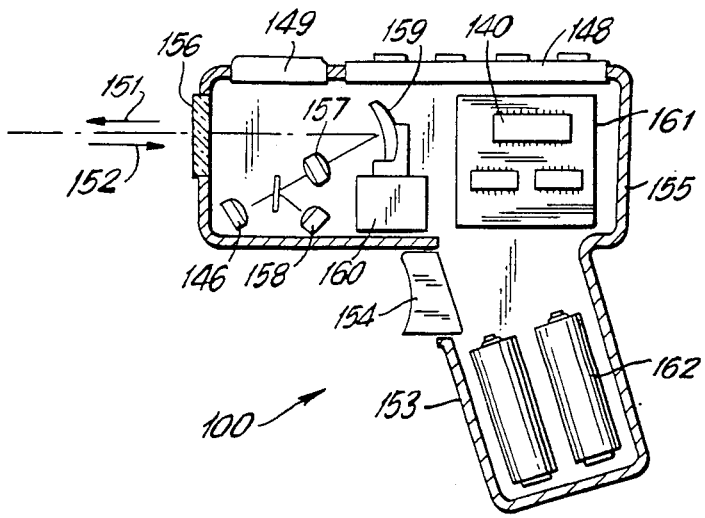
FIG.7

DECODING BAR CODE SYMBOLS BY DETERMINING THE BEST ALIGNMENT OF PARTIAL SCANS

This application is a continuation of application Ser. No. 07/461,882, filed Jan. 5, 1990, now abandoned, entitled "Method of Decoding Bar Code Symbols from Partial Scans", in the names of Frederick Schuessler and Jiali Diane Chen."

BACKGROUND OF THE INVENTION

1. Field of the Invention

This invention generally relates to the design of laser scanning systems for reading bar code symbols or similar indicia and, more particularly, to method of decoding a bar code which is possibly scanned at an angle or is poorly printed so that each scan may provide only a partial scan of the entire symbol.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically decode the symbol to multiple alphanumerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to the same assignee as the instant application.

As disclosed in some of the above patents, one embodiment of such a scanning system resides, inter alia, in an emitting a light beam from a hand-held, portable scanning head supported by a user, and aiming the head, and more particularly, the light Peam, at a symbol to be read. The scanner functions by repetitively scanning the light beam in a line across the symbol.

A portion of the reflected light which is reflected off the symbol is detected, and electronic circuitry or software decodes the electrical signal into a digital representation of the data represented by the symbol scanned.

A laser scanner includes a light source such as a gas laser or semiconductor laser that generates the light beam. The use of a semiconductor devices as the light source in scanner systems is especially desirable because of their small size, low cost and low power requirements. The laser beam is optically modified, typically by a lens, to form a beam spot of a certain size. It is preferred that the beam spot size be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the multiple-scan-line readers produce a number of scan lines at an angle to one another so these are not suitable for recognizing code 49 type of two-dimensional symbols.

In the scanning systems known in the art, the light beam is directed by a lens or similar optical components along a light path toward a target that includes a bar code symbol on the surface. A scanning component such As a mirror is also disposed in the light path. The scanning component may either sweep the beam spot across the symbol and trace a scan line across and past the symbol, or scan the field of view of the scanner or do both. A scanner also includes a sensor or photodetector. The photodetector has a field of view which extends across and slightly past the symbol and functions to detect light reflected from the symbol. The analog electrical signal from the photodetector is first typically converted into a pulse width modulated digital signal,, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, algorithm attempts to decode the scan. If the start and stop characters and the characters between them in the scan were decoded successfully and completely, the decoding process terminates and an indicative of a successful read (such as an audible beep) is provided to the user. Otherwise, the decoder receives the next scan, performs another decode attempt on that scan, and so on, until a completely decoded scan is achieved or no more scans are available.

In the prior art, the attempt to decode a scan will fail if one or more characters in the sequence (including the start/stop characters) fail to be recognized as legitimate characters. The standard decoding algorithm does not save any results of partial decoding. As a consequence a variety of different bar codes including long bar code with short height, poorly printed bar codes, or a bar code seriously marred by extraneous markings are impossible or very hard to be decoded by the standard decoding algorithm and repeated attempts must be made by the user to reorient the scanning line over the symbol.

Upon registering a decode f allure, bar code scanners and decoders known in the prior art discard the entire scanning data associated with a scan which does not decode, which for the purpose of our discussion in generic terms we describe as a distorted raw digital image. The entire scanning process described above is repeated until a scan is produced which is sufficiently free from noise or distortion so that the decoder can compare and match a legitimate character representation with the raw digital representation derived from the scan.

Such legitimate character representations are typically stored in or accessible to the decoder. However, such a method is time consuming, particularly in circumstances where it is difficult to obtain a scan which is not distorted.

Difficulties associated with the inability to read a bar code symbol or the erroneous reading of a bar code symbol are especially common in applications involving relatively long bar code messages, i.e., bar code symbols having numerous elements. As the length of the message increases, the number of elements and characters increases, thereby raising the likelihood that distortion will be introduced at some point during the scan. Accordingly, the bar code reader may scan the symbol numerous times before producing a raw digital image sufficiently free from distortion that it can be decoded.

Further, bar code symbols may contain printing defects which are arranged such that it is unlikely to obtain a single distortion free scan, i.e., valid characters cannot be produced and the bar code cannot be read. Additionally, the bar codes may be printed in a dot matrix style in which case the ability to read the bar codes depends on the resolution of the print. Using conventional methods of decoding, such bar code symbols are often unreadable since reading along any single scan line through the symbol would not result in a sequence of valid characters.

Laser scanners are not the only type of optical instrument capable of reading bar code symbols. Another type of optical reader is one which is operative being placed by the user in direct contact with the symbol to be read. Such readers typically incorporate a non-laser light source and detectors based upon charge coupled device (CCD) technology in which the size of the detector is larger than or substantially the same as the symbol to be read. Such scanners are lightweight and easy to use, but require substantially direct contact or placement of the reader on the symbol to enable the symbol to read. Such contact reading is a preferred mode of operation for some applications or as a matter of personal preference by the user. Contact or near contact reading may also be implemented in an appropriately designed laser scanner.

SUMMARY OF THE INVENTION

Briefly, and in general terms, the present invention provides a method for decoding a symbol, such symbol composed of an ordered sequence of characters, each character including a plurality of individual elements of different light reflectivity, with a complete symbol being defined as a sequence of a predetermined number of characters. More particular, the steps defining the present invention in a first embodiment are: (a) scanning the symbol along a first scanning path and storing a representation of the characters from the scan to form a first sequence; (b) scanning the symbol along another path different from the preceding scanning path and storing a representation of the sequence of characters from such scan to form a second sequence; (c) processing the first sequence and the second sequence by identifying a subsequence of characters in the first sequence with a subsequence of characters in the second sequence to form an extended sequence. The process proceeds by repeating steps (b) and (c) until all characters in said extended sequence are valid characters and constitute the complete symbol.

The invention further provides a method for decoding bar code symbols in a second embodiment in which a bar code reader and associated components using timing information associated with the flying spot beam as it scans a bar code symbol having a succession of linear elements of different light reflectivity, produce a representation of the symbol and attempt to decode the representation of the symbol in order to produce a legitimate character message containing legitimate characters which are decodable, all non-decodable characters being illegitimate.

A first representation of the bar code symbol is stored corresponding to a first scan path through a first portion of said symbol smaller than the entire symbol along with timing information representing the elapsed time between a reference time and the moment at which a predetermined bar or space, such as a start or stop character of the bar code symbol was crossed by the spot.

A second representation of the bar code symbol is stored corresponding to a second scan path through said symbol along with timing information representing the elapsed time between a second reference time and the moment at which a predetermined bar or space such as a start or stop character of the bar code symbol was crossed by the spot beam.

The timing information is utilized in conjunction with the stored information to reconstitute the complete symbol.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a table depicting the representations of all characters as defined by the Code 39;

FIGS. 5A and 5B is a highly simplified diagrammatic representation of scans across a bar code utilized in the present invention;

FIG. 6 is a highly simplified diagram representing searching for the best match decoding to the present invention; and FIG. 7 is a highly simplified pictorial representation of a hand held laser scanner in which the present intention may be implemented.

DETAILED DESCRIPTION OF THE PREFERRED EMBODIMENT

The present invention provides a method for the %design of scanning systems for reading bar code symbols or similar indicia and, more particularly, to method of decoding a bar code which is possibly s(fanned at an angle or is poorly printed so that each scan may provide only a partial scan or representation of the entire symbol.

The present invention also relates to an error correcting method enabling illegitimate characters read in a bar code symbol to be iteratively replaced with legitimate characters so as to provide a decoded bar code symbol having only legitimate characters more fully described in copending U.S. patent application Ser. No. 421,269. Specifically, the method iteratively employs otherwise useless bar code readings to efficiently produce a corrected bar code by replacing illegitimate characters with legitimate characters even only if a portion of the symbol has been scanned. The method includes the steps of storing first and second raw converted representations of first and second scan signals, respectively. The first raw converted representation or image is then corrected, or improved, using the second raw converted representation or image to form a corrected, or improved, first converted representation or image. The term "image" as used herein with respect to the invention includes any representation, modification or derivation of the analog scan signal.

Figure 1:
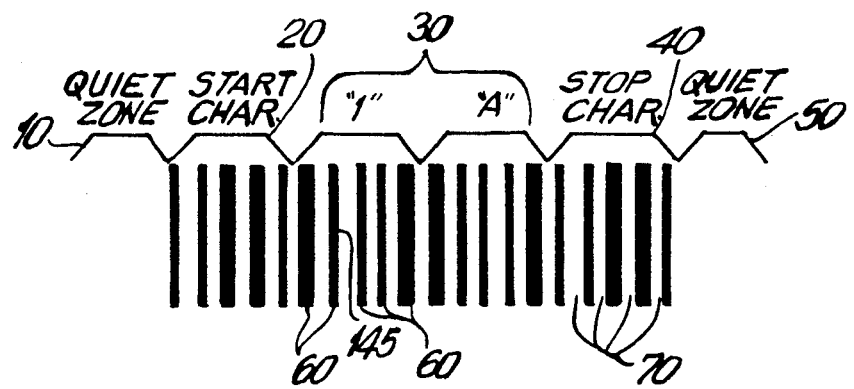
FIG. 1 depicts an illustrative bar code symbol in the Code 39 format.

The technique according to the present invention in the preferred embodiment may be used with a wide variety of different symbologies. However, for purposes of illustration, the invention will be described using Code 39, in which individual bar elements have two possible widths. Referring to FIG. 1, a typical Code 39 symbol consists of a leading quiet zone 10, a start character 20, data characters 30, a stop character 40, and a trailing quiet zone 50.

Referring now to FIGS. 1 and 2, each character of Code 39 is represented by nine elements, five bars 60 and four spaces 70. Further, each element has two possible states, wide or narrow.

While there are 512 unique combinations of nine such binary elements, Code 39 uses only forty-four to define its character set which is set forth in FIG. 2. Accordingly, there exists forty-four legitimate characters recognized by Code 39, and 468 illegitimate characters.

Figure 3:
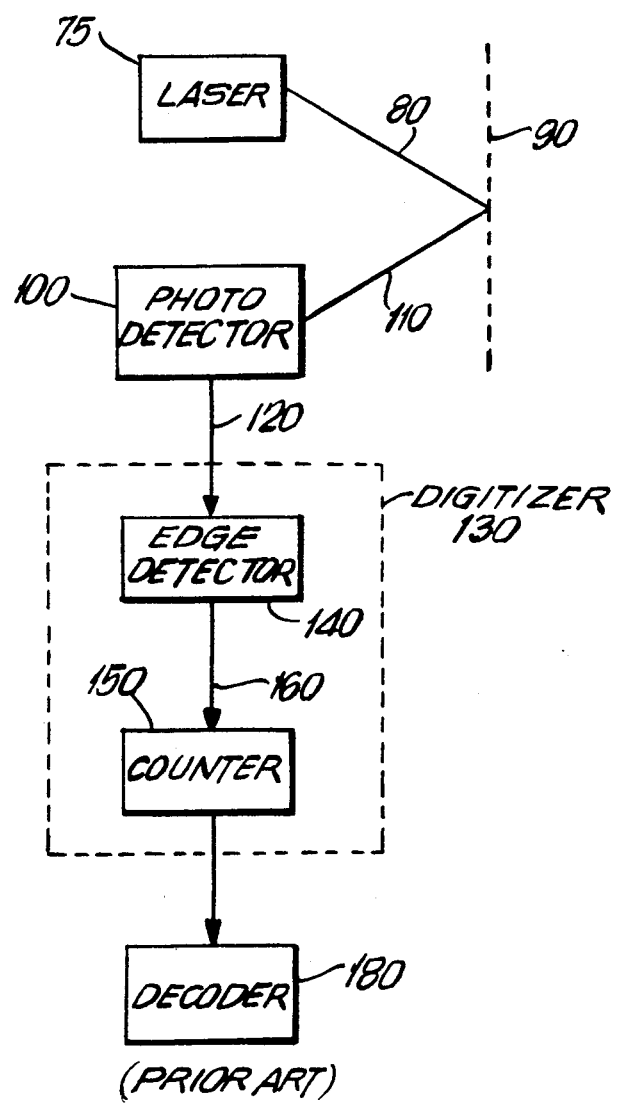
FIG. 3 is a block diagram depicting components of a conventional bar code reading device.

Referring to FIG. 3, a conventional bar code reader comprises a light source or laser 75, a photodetector 100, a digitizer 130 and a decoder 180. Digitizer 130 comprises an edge detector 140 and a counter 150.

In the preferred embodiment, the laser 75 of the bar code reading device generates an incident laser beam 80 which is swept across a bar code symbol represented by the dashed line 90. The photodetector 100 receives a portion of the reflected light 110 from the bar code symbol 90, and generates an analog electrical scan signal which varies in time in accordance with changes in the intensity of reflected beam 110.

The analog electrical scan signal is provided to a converter such as digitizer 130 by way of conductor 120. Digitizer 130, using an edge detector 140 and counter 150, detects when incident laser beam 80 crosses a boundary 145 (see FIG. 1) between any two elements. Since the rate at which the laser beam is swept over the bar code is generally constant, the travel time between two boundaries of an element is proportional to the width of the element defined by such boundaries. Accordingly, to provide a digital representation of the width of each element, edge detector 140 controls counter 150 so that the counter may measure the time interval between element boundaries. Specifically, at a first boundary, counter 150, after being initialized to zero, begins incrementing and continues incrementing as the laser sweeps across the element being measured. At the next boundary, counter 150 receives a stop signal by way of line 160 from edge detector 140. Counter 150 then stores its present count which is representative of the width of the previously scanned element. The above cycle is repeated for all elements of the bar code symbol to form a raw digital image of the bar code. The raw digital image may be distorted depending upon the quality of the printed image, or the presence of dust, dirt, or other damage.

Figure 4A:
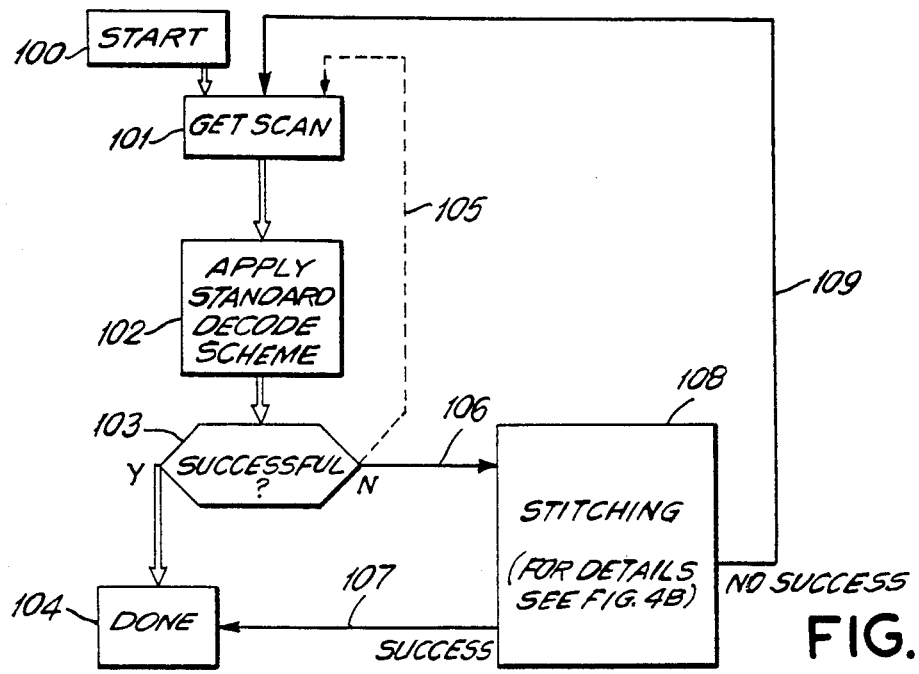
FIGS. 4A and 4B is a flow chart depicting a method for decoding a bar code symbol from multiple scan signals according to the present invention.

Turning next to FIG. 4, there is shown a flow chart depicting a method for decoding a bar code symbol from multiple scans according to the present invention. More particularly, the present invention is an extension of conventional decode algorithms which are set forth in the left hand portion of FIG. 4A. The dashed line 105 corresponds to processing steps eliminated from a conventional decoding algorithm. The remainder of the figure, and in particular the routine 108 marked "stitching", represents improvements in the decoding process added by way of the present invention.

Alternatively, in another embodiment of the present invention, the correction or improvement described above can also be performed by first decoding as much as possible the raw representation using the character-level recognition function of the standard decode algorithm, and then "stitching" any newly decoded characters to the string of characters decoded from previous scans. The previous scans are utilized to form the improved raw images where stitching ought to occur. Timing information, provided by signals from conventional laser scanners such as those referenced elsewhere in this specification, may be used to identify those points where stitching should occur. This method can replace the "Best Match Searching" algorithm (procedure 122 in FIG. 4B) under conditions where the timing information is a good predictor of correct stitching offset. This condition is met when the scan rate of the laser beam is high when compared to any movement of the barcode relative to the laser scanning device. When this alternate method is used, the algorithm can be set to reject excessive movement of the barcode, so as to ensure that no data characters are dropped or duplicated when stitching partial scans.

As in conventional decode algorithms, the method of the present invention according to either embodiment first performs a standard decode attempt on every scan sent to the decoder (100, 101). (The reference numerals in parentheses represent the corresponding steps or blocks shown in the flow charts of FIGS. 4A and 4B). If the result of this decode attempt (102) is a completely decoded scan, no further processing is required (103, 104). If however, the result of this decode is a partially decoded scan, the data from the scan is saved for further processing (106). The stitching algorithm (108) continues to perform decode attempts on scan combinations until a fully decoded symbol is attained (107), or a determination made that such decoding is not attainable (109). Reference is made to U.S. patent application Ser. No. 260,692, filed Oct. 21, 1988, now U.S. Pat. No. 4,933,538 which is hereby incorporated by reference, to describe techniques used to determine whether a scan or partial scan has detected a decodable symbol.

If the standard decode algorithm results in a complete decode (103,104), no processing is performed. However, if the decode is not complete, and this decode includes enough information such as at least one start/-stop character, the scan and the decoding result are saved for further processing (106) by the stitching algorithm (108). An additional scan is then performed (109), which we assume also does not result in a complete decode (103,106) so we again enter the stitching algorithm (108). Very bad scans (i.e. those that do not contain more than a few characters of decodable data) are automatically discarded.

The description of the stitching algorithm (108) according to the present invention can be briefly described with reference to FIG. 4B.

If the subsequent scan is not too bad (for example, one can find margins of the symbol (120,121) and the data pot too short), a best match searching routine (122) is performed on the previous scan and the current one. The best match routine will be described in detail subsequently. If the best match between the two scans is good enough (123) and has some distance to the second best match, the decode result of current scan is stitched to the decode result of the previous scan (124).

In the case of the best match is not good enough (123,125) or has a too small distance to the second best match, the current scan is discarded, and if too many current scans are discarded successively, the decode result from previous scans are also discarded, and an initialization is performed (128). The algorithm then restarts in the following scan (109). If too many scans are not discarded (129), additional scans are acquired (109).

If the margins are not found (120), an initialization (128) is also performed and the algorithm restarts with a new scan (109). Similarly, if margins are found but no previous stored results permits a suitable match (130,131), an initialization (128) is again performed and the algorithm restarts with a new scan (109). If a start and stop character is found (131), no initialization is performed, and additional scans are acquired (109).

This process continues until no more scans are available or a completely decoding result to be formed either by the standard decode algorithm or by the stitching algorithm.

By using this new algorithm, improved performance of a bar code scanner can be obtained. FIG. 5A shows some examples. FIG. 5A shows six scans (labelled by reference numerals 0 to 5) covered the whole bar code, but no single one of them covers the bar code completely. This case could not be decoded by standard algorithm, but algorithm according to the present invention can decode it by combining partial decoding results. FIG. 5B shows another example in which scans 0 and 1 are not decodable due to poor printing or noise in area P, and scans 2, 3, and 4 also not decodable due to similar distortions in area Q. The algorithm according to the present invention can also decode it by stitching.

The core part of the new algorithm is shown in the following chart depicted in FIG. 4B. When a scan is loaded, if two margins are not found, the algorithm performs an initialization. Otherwise, if no previous decode result recorded, an initial decoding attempt is performed.

In the process of an initial attempt, the algorithm tries to decode the two end characters. From these decoding results, the scan direction related to the bar code and the end which should be used to start to decode are found. If the partial decode result includes at least one start/stop character and is not too short and do not have too many rejections, the partial result and the binary scan are saved as represented by the sequence 121, 130, and 131. Also a relative coordinate is assigned to this initial scan. The start element of the scan is assigned to an initial value if the scan begins with a start/stop character, or the end element of the scan is assigned to a stop value if the scan ends with a start/stop character.

If a previous decoding result already exists, a best match searching process is performed (121). Here a binary match rather than a character match is used. The reason is that binary matching is more accurate than character matching and it is also more difficult to perform character match searching in the case of a tilted scan not covering start and stop characters.

Since the scans are loaded successfully, the best match occurs in at least one end of the scan. FIG. 6 shows how the best match searching is proceeds.

FIG. 6 depicts a representation of four successive scans,, with each element of a scan represented by an asterisk. The algorithm according to the present invention can be illustrated using the first two successive scans shown at the top of the Figure. The previous scan (represented by the first line in FIG. 6) is a relatively short scan. The current scan is a longer scan, and contains more elements. The best match algorithm is then employed to determine which group of elements in the first scan correspond with a group of elements in the second scan; in short, the algorithm attempts to "align" the scans so that the additional information from the scan with more information can be "stitched" to form a combined scan. The process proceeds as follows.

First, the algorithm tries to match for the left element (for safety, actually use the third element) of the previous scan correspondents to the first left element of the current scan (make left edges of two scans even). That also means that the fourth element of the previous scan correspondents to the second element of the current scan, etc. And the right element of the previous scan correspondents to the X1 element of the current scan as shown in FIG. 6. Then the algorithm tries the match for the left element of the previous scan correspondents to the third element of the current scan (the reason of not using the second element is that the match is only to try between bar and bar or space and space). And so on, the algorithm tries Try-limit times. The try times Try-limit is a predict maximum try times or the try times which ensure the overlap part of two scans equals to another predict minimum length, whichever is smaller. At the, last try above, the right end of the previous scan correspondents to the X2 element of the current scan as shown in FIG. 6.

Second, the algorithm tries to match for the right element of the previous scan correspondents to the first right element of the current scan (make right edges of two scans even). The try times in this direction is determined by three cases as follows. If X2 is located left of the end of the current scan (as the second line in FIG. 6), the try times equals to the distance between X2 and the right end of the current scan. If X1 is located right of the end of the current scan (as the third line in FIG. 6), the try times equals to Try-limit. If X1 and X2 are located different sides of the end of the current scan (as the fourth line in FIG. 6), and if the distance between X1 and the right end of the current scan is greater than Try-limit, the try times equals to zero, otherwise it equals to Try-limit minus that distance.

The algorithm calculates match score in each possible match case. In the score calculation, the match scores increases when binary elements matched, decreases a bigger number when binary elements unmatched, if the highest match score among all possible match cases is high enough and the difference between the highest score and the second highest score is also big enough, the best match is satisfied. A relative coordinate of the current scan is calculated according to the best match. Then the decode attempt is applied to the current scan under its relative coordinate.

The current decoding result then is concatenated or to introduce new descriptive term here, "stitched" to the previous result. The rules used in the stitching are shown in the following tabulation:

| Cases | 1 | 2 | 3 | 4 | 5 |
|---|---|---|---|---|---|
| Previous | a | a | r | r | a |
| Current | a | r | a | r | b |
| Stitching | a | a | a | r | I |

In the tabulation above, the reference characters a and b above represent legal character results from decoding, r represents rejection. If both decode results are legal and equal, then the stitching result is the same character. If one of them is legal character and the other is a rejection, the stitching result is the legal character. If any contradiction occurs, like in the case 5 above, that is both of decode results are legal but different, then the algorithm discards the current and previous decode results, performs an initialization (I above stands for Initialization) and restarts in the following scan, as shown in 124, 126, 128 sequence in FIG. 4(b).

A completion check is performed afterwards if no contradiction occurs in the process of decode result stitching. The completion means that both start/stop characters are found in the combined decode result and there are no rejected characters exist between these start/stop characters. The algorithm terminates in a succeed in the case of completion, goes on next scan otherwise.

Figure 4B:
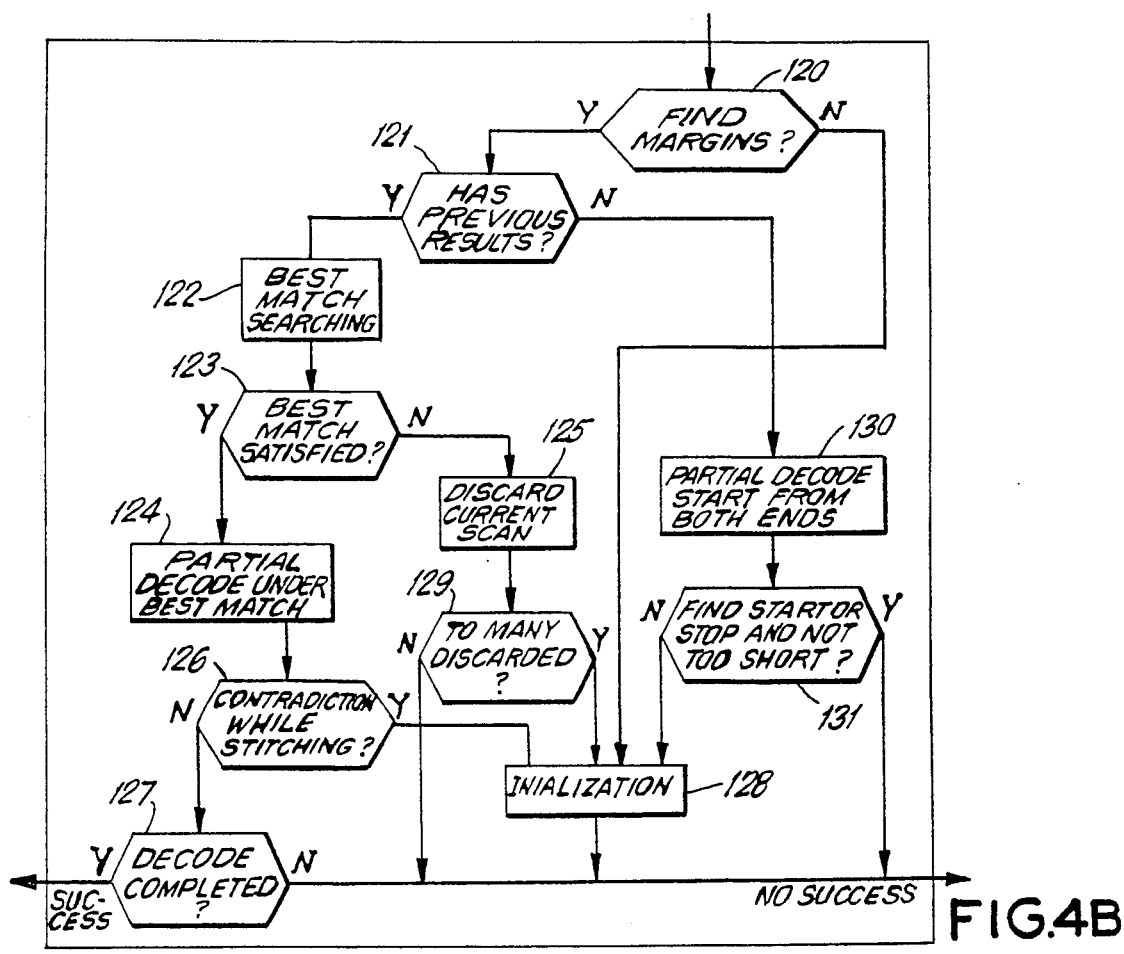

If the best match is not satisfied, the current scan is discarded as shown in 125 of FIG. 4(b). The next scan will be used to find the best match with the previous scan. If there are too many scans discarded successively (129), the previous scan and its decode result are discarded and an initialization is performed (128).

The algorithm attempts to match parts of the two strings first starting from the left and then starting from the right. The procedure involves two parameters: "OFFSET," which is an offset from the start of the previous scan and "MAX-SHIFT" which the maximum shift attempted. Although we used FIG. 6 above to illustrate the process, another description is to describe the scan matching process by considering sequence of elements as shown in the text below. The upper case letters of the alphabet (A,B,C) represent bar elements, and the lower case elements (a,b,c) space elements. Consider two scans, labelled "previous scan" and "current scan". Assume the data detected from the spans is as shown below:

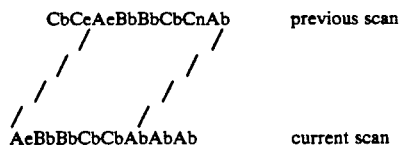

To illustrate the algorithm, we start with the element at distance OFFSET from the left of the previous scan and we attempt to match it with the leftmost element of the current scan. If we select OFFSET equal to three, then we compare the third element from the left of the previous scan (c in the example) to the leftmost element of the current scan (A in the example). While in the case of letters as shown above matching is absolute (two characters either match or do not) in the case of numbers matching is relative: for example, 20 may be matched by either 18 or 21 with 21 offering a better match than 18. Thus when compare scans we give a score for the matching (see below). If the initial match does not have a very high score, then we try to match to the next element of the current scan (it will be B in the example because we can compare bars only to bars). This process is repeated MAX-SHIFT times. After the matching of the two elements we attempt to match also subsequent ones. In the above example the subscans matched are AeBbBbCbCbAb starting from the fifth position in the previous scan and in the first position in the current scan. The rightmost matched element of the current scan is the twelfth one: X1–12. Since it is possible to have more than one match the rightmost position where such a match is possible is denoted by X2 and it is always greater then X1. It may also happen that X1 and X2 are past the end of the current scan by extrapolation: if the previous scan is longer than the current scan and it matches up to the end of the current scan, then X1 and X2 are defined to correspond to the end of the current scan.

The next step is to match the element of the previous scan which is OFFSET position from the right to the rightmost element of the current scan and if that fails to shift to the left in the previous scan, and so forth up to a certain number of attempts N-ATTEMPTS. N-ATTEMPTS is determined as following: (a), If X2 is less than the-length of the current scan N-ATTEMPTS equals MAX-SHIFT. (b) If X1 and X2 are located at different sides of the end of the current scan then we set N-ATTEMPTS equal to MAX-SHIFT minus the difference X2–X1 provide that the resulting value is positive. Otherwise N-ATTEMPTS is set to zero. Note that no matching from the right is possible in the above example.

In the typical environment, the motion of the barcode relative to the scanning device is slow or even negligible compared to the rate at which the laser spot is scanned repeatedly back-and forth across the barcode. Furthermore, the design of laser scanners such as those mentioned elsewhere in this application is such that a electrical-signal designated as the Start of Scan (SOS) signal is provided that reverses polarity in a manner that is synchronized in time with reversals of the laser scanning direction. In particular, if, for illustration, the bar code exhibits no motion relative to the scanning device, and if the SOS signal changes from low to high when a left-to-right scan begins, then it will follow that the elapsed time, measured from the low-to-high change on SOS until the time the laser spot crosses the first bar of the bar code, will be the same on every left-to-right scan. Any difference in these elapsed time measurements can therefore be ascribed to motion of the barcode relative to the scanner, said motion creating a pattern such as that shown in FIG. 5C.

A stitching algorithm that relies on the above characteristics will, by using timing predictions, limit the search for a best match to a small percentage of the raw data; the algorithm can also control how far away from the predicted time it will allow a match, and thus prevent missed characters due to excessive motion. This approach requires that, in order to begin stitching, two successive scans in the same direction pass over the same recognizable section of the bar code (e.g. the start or stop character). This allows the time difference (due to relative motion of the barcode) to be established, so that the stitching region can be quickly and accurately found on subsequent scans. This is best explained by an example, which for brevity will use the simplest (though by no means the only) case, depicted in FIG. 5C, where, due to motion of the barcode and/or of the scanner, two successive left-to-right scans (labelled S0 and S2) both cross the start character ("*"), but no one scan crosses the entire bar code. In this simple case, the right-to-left scans (S1, S3, S5, etc.) do not need to be processed, and for clarity are not shown on FIG. 5C. The algorithm for this case can be described as follows.

Figure 5C:
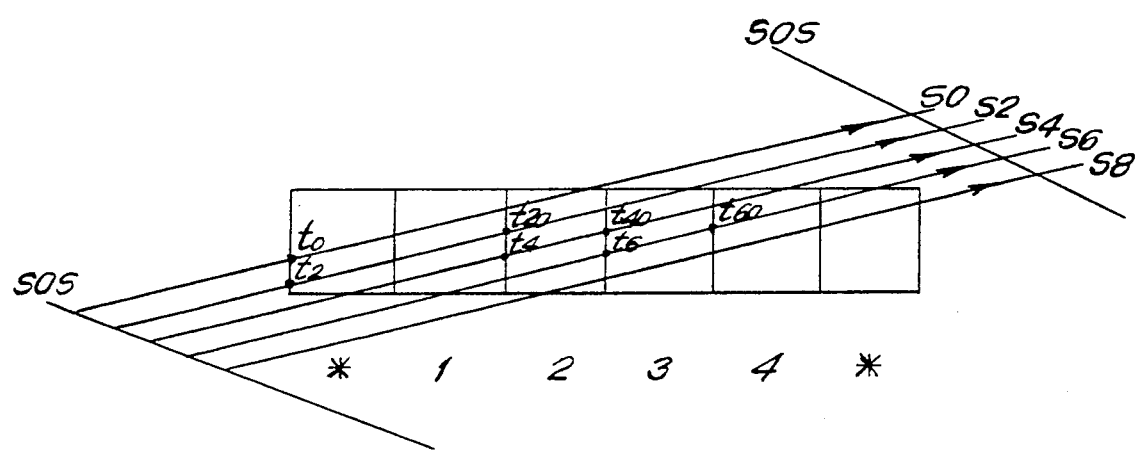
FIG. 5C is a representation of partial scans through a bar code, showing the timing information used to predict the location of the overlapping raw data on successive scans.

After initializing the process when the laser is first turned on, acquire scans until two successive scans in the same direction include a start character, as determined by using the standard decode algorithm (scans S0 and S2 in FIG. 5C) . For each scan with a recognized start character, measure the time from the Start of Scan change to when the laser crossed the first bar of the start character (SOS to t0 on scan S0, and SOS to t2 on scan S2). Calculate the time difference for the two measurements (delta0=t0-t2), which represents the relative motion of the barcode and the scanning device. For S2, also calculate the time from SOS to the start of the last successfully-decoded character ("2") of S2 (t2O). Based on this information, calculate a predicted time (for the next scan S4) between the next SOS change to them start of character 11211 on scan S4 (t4predicted=-t2O−delta0). After the raw data for scan S4 is loaded, search for the character "2" (using the standard character-decode algorithm) in a small region of raw date centered around the time of t4predicted. If the desired data character is found near its predicted time, then continue decoding additional characters until either the character-decode algorithm fails (as it would on scans S4 and S6) or until end of the barcode is successfully reached (as on scan S8). On incomplete scans, repeat the prediction process to locate the last good character of scan S(n) within the raw data of scan S(n+2).

To summarize, the second embodiment of the present invention provides a method for decoding bar code symbols in which a bar code reader and associated components using a flying spot beam scans a bar code symbol having a succession of linear elements of different light reflectivity, produce a representation of the symbol and attempt to decode the representation of the symbol in order to produce a legitimate character message containing legitimate characters which are decodable, all non-decodable characters being illegitimate. More particularly, the improvement includes the steps of storing a first representation of the bar code symbol corresponding to a first scan path through a first portion of the symbol smaller than the entire symbol, the representation including information measuring the elapsed time between (i) a reference time that has a fixed relationship to the time of the start of said scan and (ii) the moment at which a predetermined bar or space of the bar code symbol, such as the first bar of its start or stop character, was crossed by the laser spot, such elapsed time to be referred to below as $t_1$. A second representation of the bar code symbol is stored corresponding to a second scan path of said symbol, the representation including information measuring the elapsed time between (i) a reference time that has a fixed relationship to the time of the start of said scan and (ii) the moment at which a bar or space, recognizably the same as the bar or space used in the first scan, was crossed by the laser spot, such elapsed time to be referred to below as $t_2$. The difference between $t_1$ and $t_2$ is calculated and defined as $t_3$, to represent the relative motion between the scanner and the bar code symbol.

The second stored representation is used to measure the elapsed time between the reference time related to the start of the second scan and the time that the laser spot beam crosses the last decodable character during the second scan so that a string of decodable characters is defined, the length of said string being smaller than the length of the bar code symbol, the elapsed time being defined as $t_4$.

One adds $t_3$ and $t_4$ to compute a time $t_5$, which, for the next scan to be acquired, represents the elapsed time between the reference time from the start of the third scan and the time that the laser spot will begin to cross the same sequence of characters in the substring used in the second scan.

One then uses $t_5$ as the reference time to locate and decode the stored representation of a new character in the next scan, so that the stored representations can be combined to form an improved representation.

The present invention may be implemented in a hand-held, laser-scanning, bar code reader unit such as illustrated in FIG. 7. This hand-held device of FIG. 7 is generally of the style disclosed in U.S. Pat. No. 4,760,248, issued to Swartz et. al, assigned to Symbol Technologies, Inc., and also similar to the configuration of a bar code reader commercially available as part number LS 8100II from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 7. These U.S. Pat. Nos. 4,760,248, 4,387,297 and 4,409,470 are incorporated herein by reference. A outgoing light beam 151 is generated in the reader 100, usually by a laser diode or the like, and directed to impinge upon a bar code symbol a few inches from the front of the reader unit. The outgoing beam 151 is scanned in a fixed linear pattern, and the user positions the hand-held unit so this scan pattern traverses the symbol to be read. Reflected light 152 from the symbol is detected by a light-responsive device 146 in the reader unit, producing serial electrical signals to be processed for identifying the bar code. The reader unit 100 is a gun shaped device, having a pistol-grip type of handle 153 and movable trigger 154 is employed to allow the user to activate the light beam 151 and detector circuitry when pointed at the symbol to be read, thereby saving battery life if the unit is self-powered. A light-weight plastic housing 155 contains the laser light source, the detector 146, the optics and signal processing circuitry, and the CPU 140 as well as a battery 162. A light-transmissive window 156 in the front end of the housing 155 allows the outgoing light beam 151 to exit and the incoming reflected light 152 to enter. The reader 100 is designed to be aimed at a bar code symbol by the user from a position where the reader 100 is spaced from the symbol, i.e., not touching the symbol or moving across the symbol. Typically, this type of hand-held bar code reader is specified to operate in the range of perhaps several inches.

As seen in FIG. 7, a suitable lens 157 (or multiple lens system) is used to collimate and focus the scanned beam, into the bar code symbol at an appropriate reference plane, and this same lens 157 may be used to focus the reflected light 152. A light source 158 such as a semiconductor laser diode is positioned to introduce a light beam into the axis of the lens 157 by a partially-silvered mirror and other lenses or beam-shaping structure as needed, along with an oscillating mirror 159 which is attached to a scanning motor 160 activated when the trigger 154 is pulled. If the light produced by the source 158 is not visible, an aiming light may be included in the optical system, again employing a partially-silvered mirror to introduce the beam into the light path coaxially with the lens 157. The aiming light, if needed, produces a visible-light spot which is scanned just like the laser beam; the user employs this visible light to aim the reader unit at the symbol before pulling the trigger 154.

In real applications, either the length of bar code should be fixed, or an additional character should be placed in the bar code to indicate its length. If not, misdecodings may occur.

If the length of the bar code is fixed, the performance of decoding using stitching might be better than that of decoding using a complete scan, because the reject rate and the misdecode rate is less in most good quality bar code (in cases that the quality of the bar code is very very poor, the misdecode rate may be greater, but never greater then 2K times, K is the number of the scans used for stitching).

Although the present invention has been described with respect to linear or single line bar codes, it is not limited to such embodiments, but may also be applicable to stacked or two dimensional bar codes such as Code 49 and similar symbologies. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may b* adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in a method of decoding bar code symbols from partial scans, it is not intended to be limited to the details shown, since various modifications and structural changes may be made without departing in any way from the spirit of the present invention.

For example, although the present invention is described in its preferred embodiment as relating to the decoding of bar code symbols in which the detected representation of a character is either decodable or not decodable according to some single acceptability criteria, the invention may also be applied to detection of indicia having a multiple threshold level of acceptability ranging from an unacceptable or "distorted" representation of a image to an acceptable or "clear" representation of the image. The iterative process may be defined as attempting to correct portions of the scanned image from relatively distorted to relatively clear in a sequence of steps.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adaptions should and are intended to be comprehended within the meaning and range of equivalence of the following claims.

What is claimed as new and desired to be protected by Letters Patent is set forth in the appended claims.

1. A method for processing a bar code symbol composed of an ordered sequence of characters, each character including a plurality of individual elements of different light reflectivity, comprising the steps of;
    (a) scanning said symbol along a first scanning path and storing a representation of said elements from the scan to form a first sequence of elements;
    (b) scanning said symbol along another path different from the preceding scanning path and storing a representation of elements from such scan to form a second sequence of elements;
    (c) comparing elements of the second sequence to elements of the first sequence for different alignments of the first and second sequences;
    (d) calculating a score for each comparison, the score representing the degree to which elements from the second sequence match elements from the first sequence at an alignment;
    (e) identifying a best match and a next-best match based upon the scores;
    (f) determining the difference between the scores for best match and the next-best match;
    (g) in the event that the difference in scores exceeds a predetermined amount, combining the first sequence and the second sequence at the alignment that produces the best match.

2. A method as defined in claim 1, wherein said elements extend in parallel on a surface so as to form a linear pattern of bars and spaces.

3. A method as defined in claim 1, wherein said sequence of characters include a unique start character as the first character and a unique stop character as the last character, as considered in the direction of scanning.

4. A method as defined in claim 1, wherein each said step of scanning comprises directing a laser beam across at least a portion of said symbol.

5. The method of claim 1 further comprising the step of repeating steps (b) through (g).

6. A method for reading indicia having elements of different light reflectivity by a scanner comprising the steps of:
    (a) scanning a target containing a bar code symbol and detecting at least a portion of light of variable intensity reflected off the target with a sensor and generating a first electrical signal having portions representative of elements of the symbol;
    (b) detecting at least another portion of light of variable intensity reflected off the target with a sensor and generating an additional electrical signal having portions representative of elements of the symbol;
    (c) comparing portions of the additional signal to portions of the first signal for different alignments of the first and additional signals;
    (d) calculating a score for each comparison, the score representing the degree to which portions of the additional signal match portions of the first signal at an alignment;
    (e) identifying a best match and a next-best match based upon the scores;
    (f) determining the difference between the score for the best match and the next-batch match;
    (g) in the event that the difference exceeds a predetermined amount, combining the first signal and the additional signal at the alignment that produced the best match.

7. A method as defined in claim 6, wherein said step of scanning comprises directing a laser beam in a scan pattern of mutually parallel scan lines, and said step of scanning is terminated upon successful decoding.

8. A method as defined in claim 6, further comprising the step of storing said electric signals in a memory array by addressing the rows and columns of said memory array in a sequence of addresses corresponding to scanning.

9. A method as defined in claim 8 wherein the scanner is contained in a hand-held unit which includes a mutually-activated trigger, and the method further includes the step of manually activating said trigger by the user to initiate said step of scanning said target.

10. The method of claim 6 further comprising the step of repeating steps (b) through (g).

11. The method of claim 6 wherein the indicia being read is a bar code symbol.

12. A method for processing a symbol composed of an ordered sequence of characters, each character including a plurality of individual elements of different light reflectivity with a set of predetermined patterns of elements representing valid characters, while all other patterns represent invalid characters, comprising the steps of:
    (a) scanning said symbol along a first scanning path and storing a representation of said elements from the scan to form a first sequence of elements;
    (b) scanning said symbol along another scanning path different from the preceding scanning path and storing a representation of elements from such scan to form a subsequent sequence;
    (c) comparing elements of the second sequence to elements of the first sequence for different alignments of the first and second sequences;
    (d) calculating a score for each comparison, the score representing the degree to which elements from the second sequence match elements from the first sequence at an alignment;
    (e) identifying a best match and next-best match based on the scores;
    (f) determining the difference between the scores for the best match and the next-best match;
    (g) in the event that the difference in score exceeds a predetermined amount, combining the first sequence and the subsequent sequence at the alignment that produced the best match.

13. The method of claim 12 further comprising the step of repeating steps (b) through (g).

14. A method of processing a bar code symbol containing distortion, said symbol including a sequence of characters, each character including a plurality of individual elements of different light reflectivity, with a set of predetermined patterns of elements representing legitimate characters, while all other patterns represent illegitimate characters, comprising the steps of:
    (a) storing a first representation of elements of said bar code symbol derived from scanning through said bar code symbol;
    (b) storing a second representation of elements of said bar code symbol derived from scanning through only a portion of said bar code symbol;

(c) comparing elements of the second representation to elements of the first representation for different alignments of the first and second representations;

(d) calculating a score for each comparison, the score representing the degree to which elements from the second representation match elements from the first representation at an alignment;

(e) identifying a best match and a next-best match based on the scores;

(f) determining the difference between the scores for the best match and the next-best match; and (g) in the event that the difference exceeds a predetermined amount, combining the first representation and the second representation at the alignment that produced the best match.

15. The method of claim 14 further comprising the step of repeating steps (b) through (g).

* * * * *